(12) United States Patent
Kintaka

(10) Patent No.: US 9,537,175 B2
(45) Date of Patent: Jan. 3, 2017

(54) MATERIAL FOR SOLID ELECTROLYTE

(71) Applicant: MURATA MANUFACTURING CO., LTD., Nagaokakyo-Shi, Kyoto-fu (JP)

(72) Inventor: Yuji Kintaka, Nagaokakyo (JP)

(73) Assignee: MURATA MANUFACTURING CO., LTD., Nagaokakyo-Shi, Kyoto-Fu (JP)

( * ) Notice: Subject to any disclaimer, the term of this patent is extended or adjusted under 35 U.S.C. 154(b) by 0 days.

(21) Appl. No.: 14/141,613

(22) Filed: Dec. 27, 2013

(65) Prior Publication Data

US 2014/0186720 A1 Jul. 3, 2014

(30) Foreign Application Priority Data

Dec. 29, 2012 (JP) ................. 2012-289234

(51) Int. Cl.
| | |
|---|---|
| *H01M 10/0562* | (2010.01) |
| *H01M 10/0525* | (2010.01) |
| *C04B 35/486* | (2006.01) |
| *C01G 25/00* | (2006.01) |
| *C01G 29/00* | (2006.01) |

(52) U.S. Cl.
CPC ........ *H01M 10/0562* (2013.01); *C01G 25/006* (2013.01); *C01G 29/006* (2013.01); *C04B 35/486* (2013.01); *H01M 10/0525* (2013.01); *C01P 2002/72* (2013.01); *C01P 2002/76* (2013.01); *C01P 2004/62* (2013.01); *C04B 2235/3203* (2013.01); *C04B 2235/3217* (2013.01); *C04B 2235/3227* (2013.01); *C04B 2235/3298* (2013.01); *C04B 2235/5445* (2013.01); *C04B 2235/764* (2013.01); *C04B 2235/77* (2013.01); *Y02E 60/122* (2013.01); *Y02P 70/54* (2015.11)

(58) Field of Classification Search
CPC ..................... H01M 10/0562; H01M 10/0525; C01P 2004/62; C04B 35/486; C04B 2235/3203; C04B 2235/3217; C04B 2235/3227; C04B 2235/3298; C04B 2235/5445; C04B 2235/764; C04B 2235/77; Y02P 70/54; Y02E 60/122; C01G 25/006
USPC .......................................... 429/322
See application file for complete search history.

(56) References Cited

U.S. PATENT DOCUMENTS

| | | | |
|---|---|---|---|
| 2010/0079845 A1* | 4/2010 | Wang et al. .................. | 359/273 |
| 2012/0237834 A1* | 9/2012 | Ogasa ............... | H01M 10/0562 |
| | | | 429/320 |
| 2013/0224569 A1* | 8/2013 | Sakai et al. .................. | 429/163 |

FOREIGN PATENT DOCUMENTS

| | | |
|---|---|---|
| JP | 2011-051800 A | 3/2011 |
| JP | 2011-070939 A | 4/2011 |

OTHER PUBLICATIONS

Machine translation of JP-2011-070939, Apr. 7, 2011,Toyota.*
R. Murugam et al. Angew.Chem. Int. Ed., 46, 7778 (2007).

* cited by examiner

*Primary Examiner* — Jonathan Jelsma
*Assistant Examiner* — Omar Kekia
(74) *Attorney, Agent, or Firm* — Arent Fox LLP

(57) ABSTRACT

A material capable of producing a sintered body of cubic system garnet type $Li_7La_3Zr_2O_{12}$ as a solid electrolyte having specified ion conductivity by firing at relatively low temperature in short time. The material for the solid electrolyte is an oxide containing Li, La, Zr and Bi, and the oxide has a cubic system garnet crystal structure where La sites are partly or entirely substituted by Bi.

13 Claims, 2 Drawing Sheets

MATERIAL FOR SOLID ELECTROLYTE

CROSS REFERENCE TO RELATED APPLICATIONS

The present application claims priority to Japanese Patent Application No. 2012-289234, filed Dec. 29, 2012, the entire contents of which is incorporated herein by reference.

BACKGROUND OF THE INVENTION

1. Field of the Invention

The present invention relates to a novel material for solid electrolyte.

2. Description of the Related Art

In $Li_7La_3Zr_2O_{12}$ having a garnet type crystal structure, not only a tetragonal system but also cubic system is reported as a crystal system (R. Murugan et al., Angew. Chem. Int. Ed., 46, 7778 (2007)). In particular, the one having a cubic system is known to exhibit high lithium ion conductivity in the order of $10^{-4}$ S/cm. This material is expected to be used as a solid electrolyte material of an entire solid lithium ion battery because it has characteristics of excellent chemical stability, wide potential window, as well as high lithium ion conductivity. Therefore, research and development are advanced for a method for producing $Li_7La_3Zr_2O_{12}$ having a cubic system garnet type crystal structure (hereinafter, "cubic system garnet type $Li_7La_3Zr_2O_{12}$"), or a secondary battery or the like using the material.

For example, an entire solid lithium secondary battery is proposed that includes a cathode having a cathode active material; an anode having an anode active material including a lithium alloy containing at least one specified elements selected from the group consisting of Mg, Al, Si, In, Ag and Sn; and a solid electrolyte of garnet type oxide represented by a composition formula $Li_{5+x}La_3(Zr_x,A_{2-x})O_{12}$ (wherein, A represents one or more elements selected from the group consisting of Sc, Ti, V, Y, Nb, Hf, Ta, Al, Si, Ga and Ge, and X satisfies 1.4≤X<2), interposed between the cathode and the anode (JP 2011-70939 A).

Besides the above, for example, as a material in which Al is added to $Li_7La_3Zr_2O_{12}$, there is known a ceramic material containing lithium (Li), lanthanum (La), zirconium (Zr), oxygen (O) and aluminum (Al), and having a garnet type or quasi garnet type crystal structure (JP 2011-51800 A).

SUMMARY OF THE INVENTION

However, in these existent techniques, relatively severe firing conditions are employed in producing the cubic system garnet type $Li_7La_3Zr_2O_{12}$. In the reference R. Murugan et al., Angew. Chem. Int. Ed., 46, 7778 (2007), the specified oxide is prepared by firing at 1230° C. for 36 hours. In JP 2011-70939 A, calcination at 950° C. for 10 hours, and firing at 1200° C. for 36 hours are conducted. In JP 2011-51800 A, 36 hours are required for firing at 1000° C. The relatively severe firing conditions that are inevitably employed for producing a sintered body of cubic system garnet type $Li_7La_3Zr_2O_{12}$ as described above will result in various problems when it is used as a solid electrolyte.

For example, in production of a lithium ion battery, it is sometimes the case that respective active materials of the cathode or the anode (cathode: $LiCoO_2$ or the like, anode: $Li_4Ti_5O_{12}$ or the like) are mixed with the material for solid electrolyte (namely, cubic system garnet type $Li_7La_3Zr_2O_{12}$) in the forms of powder for supplying the active material in the cathode or the anode with lithium ions, and then the mixture is subjected to a heat treatment. In an entire solid lithium ion battery, a cathode, an electrolyte and an anode can be integrated by lamination, and in this case, after lamination of plural green sheets, the laminate is integrally fired.

In these cases, when the material for solid electrolyte is composed of a mixed phase rather than forming a single phase of an objective compound in the stage where the solid electrolyte is a powder (before becoming a sintered body) prior to the heat treatment of the mixture with the cathode active material or the anode active material, or prior to the firing of a laminate of the green sheets, various reactions with the electrode active materials can occur during the firing, and a desired solid electrolyte may not be obtained after sintering. Therefore, a single phase of cubic $Li_7La_3Zr_2O_{12}$ should be formed at least in the stage prior to sintering.

However, even if a single phase of cubic $Li_7La_3Zr_2O_{12}$ is formed in the stage prior to sintering, the severer the firing conditions for sintering as is in the existent techniques, the higher the possibility of reacting with contacting materials (cathode active material, anode active material and the like), and there is a fear that a desired material design cannot be made. Therefore, it is desired to be able to generate a sintered body of cubic system garnet type $Li_7La_3Zr_2O_{12}$ by firing at lower temperature in shorter time to suppress the reaction between these materials, however, such materials have not been developed yet.

Therefore, it is a primary object of the present invention to provide a material capable of producing a sintered body of cubic system garnet type $Li_7La_3Zr_2O_{12}$ serving as a solid electrolyte having specified ion conductivity by firing at relatively low temperature in short time.

As a result of diligent efforts in light of the aforementioned problems in the existent techniques, the inventor of the present invention found that the above object can be achieved by employing a specified composition, and accomplished the present invention.

That is, the present invention relates to the following material for solid electrolyte.

A material for solid electrolyte for use for a solid electrolyte, wherein (1) the material is an oxide containing Li, La, Zr and Bi, and (2) the oxide has a cubic system garnet crystal structure wherein La sites are partly or entirely substituted by Bi.

Preferably, a substitution amount of Bi is 1 to 20% by mol in 100% by mol of La.

In the material for a solid electrolyte, Al is preferably contained in a cubic system garnet crystal structure represented by composition formula $Li_7(La_{1-x}Bi_x)_3Zr_2O_{12}$ (provided that x satisfies 0.01≤x≤0.2).

<4> Preferably, the Al is contained in an amount of 0.5 to 2.5 parts by weight in terms of $Al_2O_3$ relative to 100 parts by weight of the cubic system garnet crystal represented by composition formula $Li_7(La_{1-x}Bi_x)_3Zr_2O_{12}$ (provided that x satisfies 0.01≤x≤0.2).

In the material for a solid electrolyte, it is preferred that no peak of Al or an Al compound is observed in X-ray diffraction analysis.

A method for producing a solid electrolyte-containing sintered body includes firing a raw material containing the above-mentioned material for a solid electrolyte at a temperature of 900 to 1150° C. for 1 to 10 hours to obtain a sintered body.

The raw material is preferably a mixture containing the material for solid electrolyte, and a cathode active material or an anode active material.

The raw material may also be a laminate including, in sequence, a layer formed of a green sheet for cathode, a layer containing the material for solid electrolyte, and a layer formed of a green sheet for anode.

A further method for producing a material for solid electrolyte made of an oxide containing Li, La, Zr and Bi and having a cubic system garnet crystal structure, includes firing a mixed powder containing an Li component, an La component, a Bi component and a Zr component and having a composition formula $Li_7(La_{1-x}Bi_x)_3Zr_2O_{12}$ (provided that, x satisfies $0.01 \leq x \leq 0.2$) in an oxidative atmosphere at 900 to 1150° C.

Yet a further method for producing a material for a solid electrolyte made of an oxide containing Li, La, Zr and Bi and having a cubic system garnet crystal structure, includes calcining a mixed powder containing an Li component, a La component and a Zr component in an oxidative atmosphere, and firing a Bi-containing mixed powder containing the calcined object and a Bi component or its molded body and having a composition formula $Li_7(La_{1-x}Bi_x)_3Zr_2O_{12}$ (provided that, x satisfies $0.01 \leq x \leq 0.2$) in an oxidative atmosphere at 900 to 1150° C.

The material for solid electrolyte of the present invention can be sintered by firing at low temperature in short time. Therefore, in firing the material for solid electrolyte of the present invention together with a green sheet for electrode or the like, the firing may be executed in relatively mild conditions, so that it is possible to effectively suppress or prevent reaction with an electrode active material or the like that can otherwise occur during firing. In addition, the material for solid electrolyte of the present invention can also contribute to effective suppression or prevention of undesired reaction during firing because it is substantially formed of a single phase of cubic system garnet crystal phase. Since undesired reaction can be suppressed as described above, it is possible to form a solid electrolyte having a composition in conformity with a requested design, and thus a laminate of electrode layers and the solid electrolyte.

Further, since a sintered body (namely, solid electrolyte) can be produced by firing at low temperature in short time, the present invention is advantageous also in the points of production efficiency, production cost and the like.

The material for solid electrolyte of the present invention having such features can be suitably used not only for production of a solid electrolyte, but also for production of a solid electrolyte-containing sintered body (for example, an electrode containing solid electrolyte grains, a sintered body of a laminate of electrode layers and solid electrolyte layer). Such a sintered body is especially suited, for example, for a solid electrolyte of a battery (in particular, entire solid lithium ion secondary battery).

DETAILED DESCRIPTION OF THE INVENTION

Figure 1:
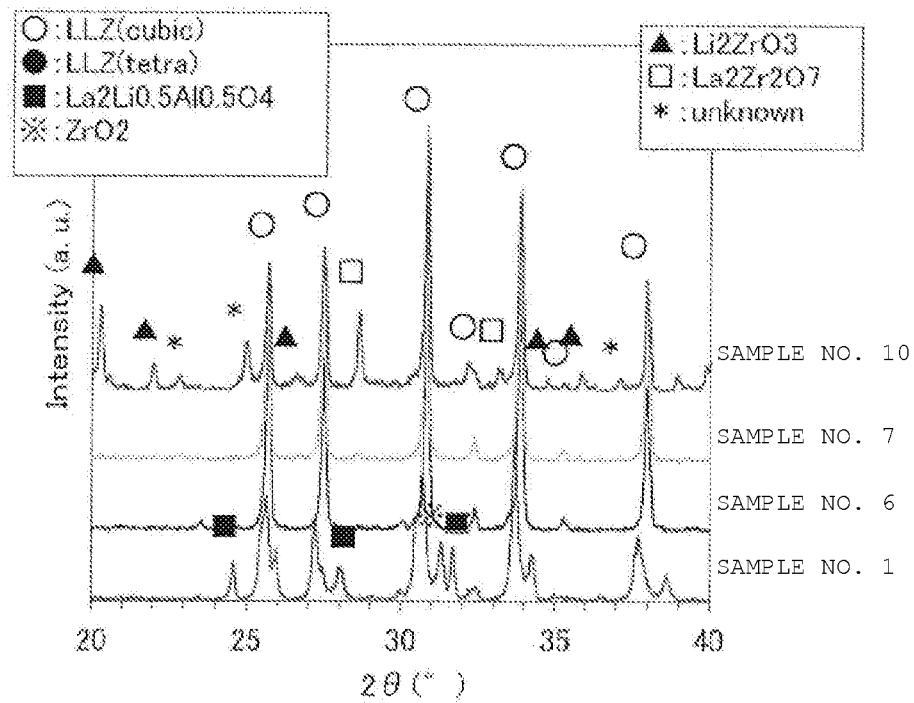
FIG. 1 is a view showing a result of X-ray diffraction analysis of a material for solid electrolyte prepared in Example 1.

1. Material for Solid Electrolyte and Production Method Thereof.

1-1. Material for Solid Electrolyte

The material for solid electrolyte according to the present invention (present material) is a material for use as a solid electrolyte, and is featured in that (1) the material is an oxide containing Li, La, Zr and Bi, and (2) the oxide has a cubic system garnet crystal structure where La sites are partly or entirely substituted by Bi.

The present material is an oxide containing Li, La, Zr and Bi, and has a cubic system garnet crystal structure where La sites are partly or entirely substituted by Bi. Preferably, the amount of substitution by Bi of La sites is typically, but not limited to, 1 to 20% by mol in 100% by mol of La (in particular, 2 to 15% by mol in 100% by mol of La). By setting the amount within the above range, it is possible to obtain a crystal structure capable of exerting desired ion conductivity more reliably, and to allow completion of sintering at lower temperature in shorter time in production of a sintered body. Although the mechanism of exerting the operational effect by partly or entirely substituting La sites by Bi is not known, it is supposed to be as follows. Assuming the case that Zr site is substituted by Bi, pentavalent Bi substitutes for the site of tetravalent Zr. This causes a phenomenon of reducing the Li amount for keeping the electric neutrality, and can result in decrease in lithium ion conductivity due to reduction in the Li amount. In contrast, when La site is substituted by Bi, the substitution occurs in the condition that both of these are in trivalent states, so that the aforementioned phenomenon does not occur. As a result, desired lithium ion conductivity would be kept. Also from this view point, the present material essentially requires that La site is substituted by Bi, but Zr site may be substituted by Bi unless large decrease in lithium ion conductivity occurs. The La substitution condition by Bi may be examined by a known method, and for example, an XAFS (X-ray absorption fine structure) analysis using radiation light can be preferably employed.

In the present material, a component other than the aforementioned Li, La, Zr and Bi may be contained unless the effect of the present invention is interfered. In particular, in the present invention, it is preferred that Al is contained from the view points of densification, conductivity and so on. Therefore, as the composition of the present material, it is preferred that Al is contained in the cubic system garnet crystal structure particularly represented by $Li_7(La_{1-x}Bi_x)_3Zr_2O_{12}$ (provided that x satisfies $0.01 \leq x \leq 0.2$) although the composition is not particularly limited as far as it has the aforementioned crystal structure. In this case, it is preferred that Al is contained in any one site (solid-solved). In other words, it is preferred that no peak of Al and Al compound is observed in the X-ray diffraction analysis. As a result, it is possible to set the firing conditions in production of a sintered body much milder, and it is possible to avoid undesired reaction in production of a lithium ion battery by forming a single phase of the same crystal phase as cubic system garnet type $Li_7La_3Zr_2O_{12}$. From this point of view, the content of Al is preferably, but not particularly limited to, 0.5 to 2.5 parts by weight in terms of $Al_2O_3$, and particularly preferably 1.0 to 1.5 parts by weight relative to 100 parts by weight of the $Li_7(La_{1-x}Bi_x)_3Zr_2O_{12}$ from the view points of densification, conductivity and so on as mentioned above.

In the present material, in the cubic system garnet crystal structure represented by the above $Li_7(La_{1-x}Bi_x)_3Zr_2O_{12}$ (provided that x satisfies $0.01 \leq x \leq 0.2$), La sites may be substituted by an element other than Bi unless the effect of the present invention is interfered. Li sites or Zr sites may be partly or entirely substituted by other element.

Examples of the element to be substituted for La sites include at least one of rare earth elements and alkaline earth elements. Examples of the rare earth elements include yttrium. Examples of the alkaline earth elements include strontium, calcium, and barium. Examples of the element to be substituted for Li sites or Zr sites include tantalum, niobium and bismuth.

While the property of the present material is not particularly limited, typically it is preferably provided in the form of powder. When it is provided in the form of powder, a non-limitative desired range of the average grain size is typically 0.01 to 10 μm, and particularly 0.1 to 5 μm.

1-2. Production Method of Material for Solid Electrolyte

While the production method of the present material is not particularly limited, it can be prepared, for example, by 1) a production method including the step of firing mixed powder containing Li component, La component, Bi component and Zr component and having a composition formula $Li_7(La_{1-x}Bi_x)_3Zr_2O_{12}$ (provided that, x satisfies $0.01 \leq x \leq 0.2$) in an oxidative atmosphere at 900 to 1150° C. (First method), or by 2) a production method including the step of calcining mixed powder containing Li component, La component and Zr component in an oxidative atmosphere, and the step of firing Bi-containing mixed powder containing the calcined object and Bi component or its molded body and having a composition formula $Li_7(La_{1-x}Bi_x)_3Zr_2O_{12}$ (provided that, x satisfies $0.01 \leq x \leq 0.2$) in an oxidative atmosphere at 900 to 1150° C. (Second method).

1) First Method

First method includes the step of firing mixed powder containing Li component, La component, Bi component and Zr component in an oxidative atmosphere at 900 to 1150° C.

As Li component, in addition to Li simple substance, compounds serving as supply sources of Li may be used. As the compounds, oxides, hydroxides, salts and the like of Li may be used. More specific examples thereof include lithium oxide, lithium hydroxide, lithium carbonate, lithium hydrogencarbonate, lithium bromide, lithium chloride, and lithium acetate.

As La component, in addition to La simple substance, compounds serving as supply sources of La may be used. As the compounds, oxides, hydroxides, salts and the like of La may be used. More specific examples thereof include lanthanum hydroxide, lanthanum oxide, and lanthanum sulfate.

As Bi component, in addition to Bi simple substance, compounds serving as supply sources of Bi may be used. As the compounds, oxides, hydroxides, salts and the like of Bi may be used. More specific examples thereof include bismuth oxide, bismuth bromide, bismuth chloride, bismuth hydroxide, and bismuth sulfate.

As Zr component, in addition to Zr simple substance, compounds serving as supply sources of Zr may be used. As the compounds, oxides, hydroxides, salts and the like of Zr may be used. More specific examples thereof include zirconium oxide, zirconium hydroxide, zirconium oxychloride, zirconium sulfate, and zirconium acetate.

When Al is contained in addition to the foregoing components from the view points of densification, conductivity and so on as described above, Al component may be mixed in a specified amount as described above. As Al component, in addition to Al simple substance, compounds serving as supply sources of Al may be used. As the compounds, oxides, hydroxides, salts and the like of Al may be used. More specific examples thereof include aluminum oxide, aluminum hydroxide, aluminum nitrate, aluminum sulfate, aluminum chloride, aluminum oxalate, aluminum acetate, aluminum acetylacetonate, aluminum triethoxide, aluminum butoxide, aluminum propoxide, aluminum methoxide, triethylaluminum, and trimethylaluminum.

In First method, the combination ratio of Li component, La component, Bi component and Zr component may be formulated in a stoichiometric composition of the present material. Formulation to give a composition formula $Li_7(La_{1-x}Bi_x)_3Zr_2O_{12}$ (provided that, x satisfies $0.01 \leq x \leq 0.2$) is particularly preferred. In other words, in the present invention, the mixing amount of La component may be reduced by the amount of substitution by Bi so that La sites can be reliably substituted by Bi.

By mixing these components, mixed powder is prepared. In this case, either wet mixing or dry mixing may be applied. While not being limitative, typically, average grain size of mixed powder may be appropriately adjusted within the range of 0.1 to 1.0 μm.

The mixed powder is fired in an oxidative atmosphere at 900 to 1150° C. The firing atmosphere is not limited as far as it is an oxidative atmosphere, and for example, it may be atmospheric air. The firing temperature is preferably 900 to 1100° C., and more preferably 950 to 1050° C. The firing time may be adjusted depending on the firing temperature or the like, and is preferably 1 to 10 hours, and more preferably 1 to 5 hours. As described above, the present material can be obtained at relatively low temperature in short time. In other words, it is possible to obtain an oxide having a single phase of a cubic system garnet crystal structure.

2) Second Method

Second method includes the step of calcining mixed powder containing Li component, La component and Zr component in an oxidative atmosphere (calcining step) and the step of firing Bi-containing mixed powder containing the calcined object and Bi component or its molded body in an oxidative atmosphere at 900 to 1150° C. (firing step).

In the calcining step, mixed powder containing Li component, La component and Zr component is calcined in an oxidative atmosphere. In this case, the kinds of components which form a raw material, the preparation method of mixed powder, the average grain size of mixed powder and the like may be identical to those in First method. Therefore, it is possible to further mix Al component as necessary.

In Second method, the mixing ratio of Li component, La component and Zr component, and the mixing ratio of Bi component added later may be formulated in a stoichiometric composition of the present material. Formulation to give a composition formula $Li_7(La_{1-x}Bi_x)_3Zr_2O_{12}$ (provided that, x satisfies $0.01 \leq x \leq 0.2$) is particularly preferred. In other words, the mixing amount of La component may be reduced by the amount of substitution by Bi so that La sites can be reliably substituted by Bi.

The calcination may be conducted in an oxidative atmosphere, and may be conducted, for example, in atmospheric air. While the calcination temperature is not particularly limited, desirably it is typically 900 to 1100° C., and particularly 950 to 1050° C. While the calcination time may be appropriately adjusted depending on the calcination temperature or the like, it may be typically 1 to 10 hours, and preferably 1 to 5 hours.

In the firing step, Bi-containing mixed powder containing the calcined object and Bi component or its molded body is fired in an oxidative atmosphere at 900 to 1150° C.

As Bi component, those as recited in First method may be used. Also the firing conditions may be similar to those in First method.

Bi-containing mixed powder containing the calcined object and Bi component may be prepared according to a known mixing method. In this case, either dry mixing or wet mixing may be applied. Also the calcined object may be subjected to grinding, classification and the like prior to mixing as necessary. In the case of firing a molded body, Bi-containing mixed powder may be preliminarily molded. As the molding method, known methods such as press molding, injection molding, cast molding, and hydrostatic molding may be employed. In molding, known additives such as an organic binder may be mixed as necessary. When a molded body is fired, the obtained sintered body can also be used as the present material by being ground by a known method.

2. Solid Electrolyte and Solid Electrolyte-Containing Sintered Body, and Method for Producing the Same The present invention involves a method for producing a solid electrolyte-containing sintered body including the step of firing a raw material containing the material for solid electrolyte of the above 1. at a temperature of 900 to 1150° C. for 1 to 10 hours to obtain a sintered body. In other words, by further firing the present material, it is possible to obtain a specified sintered body.

The raw material is not particularly limited as far as the present material is contained. For example, a mixture containing a cathode active material or an anode active material of lithium ion battery (collectively referred to as "electrode active material") and the present material may be used as the raw material.

More particularly, for example, 1) mixed powder containing powder of the electrode active material and the powdery present material, 2) a laminated green sheet containing, in sequence, a layer formed of a green sheet for cathode, a layer containing the material for solid electrolyte, and a layer formed of a green sheet for anode, or the like may be used as the raw material.

In the case of the above 1), as the electrode active material, those similar to the electrode active materials employed in a known lithium ion battery may be used. As the cathode active material, for example, compounds of lithium and transition metal (Ni, Mn, Ti, Fe or the like) may be used. More specific examples thereof include lithium-containing metal oxides such as $LiCoO_2$, $LiMn_2O_4$, $LiNiO_2$, $Li(Ni, Mn, Co)O_2$, $LiFePO_4$, and $Li_4Ti_5O_{12}$. As the anode active material, for example, in addition to 1) carbon-based materials such as graphite, amorphous carbon, and carbon black, 2) oxides of metal such as silicon, titanium, tin, niobium, or molybdenum, 3) materials capable of reversibly storing or releasing lithium ions such as metal lithium, lithium compounds or lithium alloys (including intermetallic compounds) may be used.

The content of the present material may be typically, but not limited to, 20 to 80 parts by weight, relative to 100 parts by weight of the electrode active material. The average grain size of mixed powder may be appropriately set typically within the range of 0.1 to 10 μm.

In the case of the above 2), the method for producing a laminated green sheet is not particularly limited, but it is especially preferred to employ a method of using a slurry (pasty matter) containing a starting material capable of forming each layer. To be more specific, for example, i) a method of producing a laminated green sheet by laminating green sheets that are respectively produced in advance by using a slurry (monolayer green sheets), ii) a method of producing a laminated green sheet by overlaying another layer by applying a slurry on a monolayer green sheet surface followed by drying, or iii) a method of producing a laminated green sheet by combination of the above i) and ii) may be employed.

In the present invention, regarding formation of one kind of layer, one precursor layer may be formed of one monolayer green sheet or one coating layer having the same composition, or one layer may be formed by plurally laminating a monolayer green sheet or a coating layer having the same composition.

A method for preparing the slurry is not particularly limited, and for example, it can be desirably prepared by mixing (wet mixing) and dispersing the starting material in an organic vehicle (organic binder) in which a polymeric material is dissolved in a solvent.

As the starting materials (excluding the starting material for solid electrolyte), material themselves forming respective layers shown in the above 1-1. or precursors thereof may be used. Examples of the precursors include respective amorphous materials of the oxides, and compounds (hydroxides, chlorides and the like) capable of becoming crystalline oxides (polycrystalline materials) by firing. As the starting material for solid electrolyte, the present material is used. These starting materials can be used preferably in the form of powder. The average grain sizes of the powders may be, but not limited to, typically about 0.01 to 10 μm, and preferably within the range of 0.1 to 5.0 μm from the view points of sintering property, dispersibility and so on.

As the polymeric material, for example, acryl resin, urethane resin, polyester resin, polyethylene resin, polypropylene resin, polyvinyl acetate, polyvinyl alcohol, polyvinyl butyral, polybutadiene, chloroprene rubber or the like can be used.

Examples of the solvent include ethanol, isopropyl alcohol, toluene, acetone, methylethylketone, and normal-hexane. These can be appropriately selected depending on the kind or the like of the polymeric material to be used.

The slurry may contain other components (plasticizer, dispersant, colorant, thickener and so on) as necessary. In particular, in the present invention, it is preferred to mix a plasticizer, for example, from the view point of improving adhesion between green sheets. While the kind of the plasticizer is not particularly limited, for example, phthalic acid esters such as dioctyl phthalate and diisononyl phthalate can be preferably used.

In preparation of the slurry, the method for wet mixing is not limitative, and either a method using a medium or a method not using a medium can be employed. As a method using a medium, for example, a ball mill method, a Visco mill method or the like can be employed. On the other hand, as a method not using a medium, for example, a sand mill method, high-pressure homogenizer method, a kneader dispersion method or the like can be used. In preparing a slurry, the solid content in the slurry is not particularly limited, and may be appropriately set typically within the range of 30 to 70% by weight.

Each method for forming a precursor layer (the aforementioned production method or coating method of monolayer green sheet) is not particularly limited, and for example, die coater, comma coater, screen printing or the like may be used. The method for laminating green sheets is not particularly limited, and for example, hot isostatic pressing (HIP), cold isostatic pressing (CIP), warm isostatic pressing (WIP) or the like may be preferably used.

In the present invention, by firing such a raw material at a temperature of 900 to 1150° C. for 1 to 10 hours, a sintered body (solid electrolyte-containing sintered body) can be obtained. The firing atmosphere is not limited as far as it is an oxidative atmosphere, and for example, it may be atmospheric air. The firing temperature is preferably 900 to 1100° C., and more preferably 950 to 1050° C. The firing time may be appropriately adjusted depending on the firing temperature or the like, and is preferably 1 to 10 hours, and more preferably 1 to 5 hours. Since a sintered body can be obtained at relatively low temperature in short time as described above, reaction between the present material and the electrode active material or the like can be effectively suppressed, with the result that the material composition and characteristics in conformity with the design can be obtained more reliably. The sintered body in the present invention refers to the one having a density of 80% or more of theoretical density.

3. Entire Solid Lithium Ion Secondary Battery

The present invention involves not only a solid electrolyte formed of a sintered body of the present material, but also an entire solid lithium ion secondary battery including the solid electrolyte. In this case, particularly, the solid electrolyte-containing sintered body produced in the above 2. can be preferably used, for example, as a solid electrolyte, an electrode, an electrode/solid electrolyte laminate or the like.

As the makeup of the entire solid lithium ion secondary battery according to the present invention, an appropriate makeup can be employed from makeups of known entire solid lithium ion secondary batteries depending on the kind of the battery and so on. Therefore, a specified battery can be assembled by appropriately attaching a current collector, a terminal, a storage container and the like employed in known entire solid lithium ion secondary batteries as necessary.

Further, the shape of the battery is not particularly limited. For example, any shape selected from coin shape, pin shape, paper shape, cylindrical shape and square shape can be employed.

EXAMPLES

In the following, the feature of the present invention will be described in more detail by way of examples. It is to be noted that the scope of the present invention is not limited by these examples.

Example 1

As the starting materials, respective powders of $Li_2CO_3$, $La(OH)_3$, $ZrO_2$, $Bi_2O_3$, and $Al_2O_3$ (respectively having average grain size of about 0.5 μm) were used. First, the components other than $Al_2O_3$ were weighed to satisfy the value of x in the composition formula $Li_7(La_{1-x}Bi_x)_3Zr_2O_{12}$ as shown in Table 1, and mixed. Then $Al_2O_3$ was added in an amount of 1.2 parts by weight relative to 100 parts by weight of $Li_7(La_{1-x}Bi_x)_3Zr_2O_{12}$. These powders were mixed by wet mixing using zirconia balls, and dried, and then put into a magnesia container where it was calcined in atmospheric air at 1000° C. for 3 hours, to give calcined powder (present material). The obtained calcined powder was subject to powder X-ray diffraction analysis to identify its crystal phase. The result is shown in Table 1. The X-ray diffraction patterns of Sample number 1 (x=1), Sample number 6 (x=0.05), Sample number 7 (x=0.1), and Sample number 10 (x=0.3) in the form of calcined powder are shown in FIG. 1. $Li_7La_3Zr_2O_{12}$ had a tetragonal system garnet crystal structure (LLZ (t)) when x=0 to 0.005, with coexistence of $La_2Li_{0.5}Al_{0.5}O_4$ as an intermediate phase. On the other hand, it was a single phase showing the same pattern as cubic system garnet type $Li_7La_3Zr_2O_{12}$ (LLZ (cubic)) when x=0.01 to 0.2.

Regarding Sample numbers 6 and 7, the aforementioned calcined powder was wet ground to give a powder having an average grain size of about 0.5 μm. The obtained powder was molded into a tablet having a diameter of 10 mm and a thickness of 3 mm by casting. This molded body was fired in atmospheric air at 1000 to 1100° C. for 3 hours, to obtain a sintered body having a diameter of 8 mm and a height of 2.5 mm. The density of the obtained sintered body was calculated from the weight and the dimension. The result is shown in Table 2. Further, after polishing the sintered body to have a thickness of 1 mm, a Pt electrode was vapor-deposited on both end faces, and AC impedance was measured. AC impedance was measured in a constant-temperature bath at 25° C. with a frequency of 0.1 Hz to 1 MHz and an amplitude voltage of 100 mV, and a value of resistance was determined from the arc of the Nyquist plot, and from the value, lithium ion conductivity of the sample was calculated (ditto for the following Examples and Comparative Examples). The result is shown in Table 2.

TABLE 1

| Sample number | x | Calcined powder constituting phase |
|---|---|---|
| 1* | 0 | LLZ (t) + $La_2Li_{0.5}Al_{0.5}O_4$ + $ZrO_2$ |
| 2* | 0.005 | LLZ (t) + $La_2Li_{0.5}Al_{0.5}O_4$ + $ZrO_2$ |
| 3 | 0.01 | LLZ (cubic) |
| 4 | 0.02 | LLZ (cubic) |
| 5 | 0.03 | LLZ (cubic) |
| 6 | 0.05 | LLZ (cubic) |
| 7 | 0.1 | LLZ (cubic) |
| 8 | 0.15 | LLZ (cubic) |
| 9 | 0.2 | LLZ (cubic) |
| 10* | 0.3 | LLZ (cubic) + $Li_2ZrO_3$ + $La_2Zr_2O_7$ |

*outside the scope of the present invention

TABLE 2

| Sample number | Firing temperature | Sintered density (g/cm$^3$) | Lithium ion conductivity (S/cm) |
|---|---|---|---|
| 6 | 1100° C. | 4.42 | 1.4.E−04 |
| 7 | 1000° C. | 4.43 | 3.0.E−04 |
| 7 | 1050° C. | 4.46 | 3.1.E−04 |
| 7 | 1100° C. | 4.38 | 1.6.E−04 |

As can be seen from the results in Table 1 and Table 2, the present material is formed of a single phase having the same crystal structure as cubic system garnet type $Li_7La_3Zr_2O_{12}$ by containing a specified amount of Bi, and a sintered body having desired lithium ion conductivity can be provided by firing at relatively low temperature in short time by using the same.

Example 2

Figure 2:
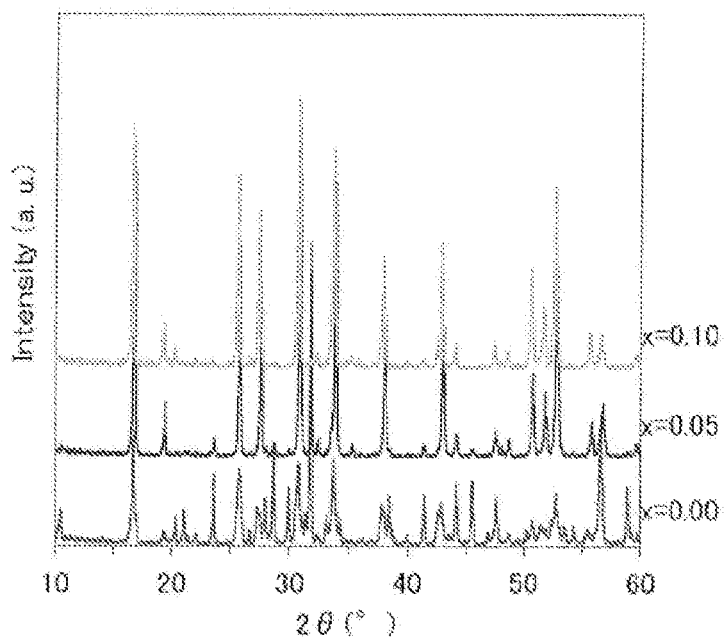
FIG. 2 is a view showing a result of X-ray diffraction analysis of a material for solid electrolyte prepared in Example 2.

As the starting materials, respective powders of $Li_2CO_3$, $La(OH)_3$, $ZrO_2$, $Bi_2O_3$, and $Al_2O_3$ (respectively having average grain size of about 0.5 μm) were used. First, the components other than $Al_2O_3$ were weighed to satisfy x=0.00, 0.05 and 0.10 in the composition formula $Li_{7.7}$ ($La_{1-x}Bi_x$)$_3Zr_2O_{12}$, and mixed. Then $Al_2O_3$ was added in an amount of 1.2 parts by weight relative to 100 parts by weight of $Li_{7.7}$($La_{1-x}Bi_x$)$_3Zr_2O_{12}$. Calcined powder (average grain size: about 2 μm) was prepared in a similar manner as in Example 1 except that calcination was conducted at 900° C. for 3 hours. An X-ray diffraction pattern of the obtained calcined powder is shown in FIG. 2. As a result, in the case of x=0.00, tetragonal $Li_7La_3Zr_2O_{12}$, $La_2Zr_2O_7$, and $Li_2CO_3$ were major constituting phases. On the other hand, in the cases of x=0.05 and x=0.10, it was confirmed that the pattern was as same as cubic $Li_7La_3Zr_2O_{12}$, and was composed of almost a single phase. In the composition of x=0.10, calcined powder was wet ground and molded, and then fired in atmospheric air at 1000° C. for 3 hours to obtain a sintered body in a similar manner as in Example 1. Density of the obtained sintered body was 4.28 g/cm$^3$, and lithium ion conductivity was $1.2 \times 10^{-4}$ S/cm.

Comparative Example 1

As the starting materials, respective powders of $Li_2CO_3$, $La(OH)_3$, $ZrO_2$, and $Al_2O_3$ (respectively having average grain size of about 0.5 μm) were used. First, the components other than $Al_2O_3$ were weighed to satisfy the composition formula $Li_{7.7}La_3Zr_2O_{12}$, and mixed. Then $Al_2O_3$ was added in an amount of 1.2 parts by weight relative to 100 parts by weight of $Li_{7.7}La_3Zr_2O_{12}$. As for the rest, calcined powder was prepared in a similar manner as in Example 1. Then $Bi_2O_3$ was added to occupy 2.5 wt % of the weight of the calcined powder, and wet ground, to give a powder having an average grain size of about 0.5 μm. The obtained powder was molded into a tablet having a diameter of 10 mm and a thickness of 3 mm by casting. This molded body was fired in atmospheric air at 1000° C. for 3 hours, to obtain a sintered body having a diameter of 8 mm and a height of 2.5 mm. As a result of X-ray diffraction analysis of the obtained sintered body, $Li_7La_3Zr_2O_{12}$ had a tetragonal system garnet crystal structure, with coexistence of $La_2Li_{0.5}Al_{0.5}O_4$ as an intermediate phase. Density of the obtained sintered body was 3.50 g/cm$^3$ and lithium ion conductivity was $2.5 \times 10^{-6}$ S/cm. In addition, a large number of segregated Bi observed in the sintered body suggests that Bi was likely to be segregated mainly in the grain boundary rather than being substituted for La.

Example 4

As the starting materials, respective powders of $Li_2CO_3$, $La(OH)_3$, $ZrO_2$, $Bi_2O_3$, and $Al_2O_3$ (respectively having average grain size of about 0.5 μm) were used. First, the components other than $Al_2O_3$ were weighed to satisfy each composition shown in Table 3, and mixed. Then $Al_2O_3$ was added in an amount of 1.2 parts by weight relative to 100 parts by weight of each composition in Table 3. Calcination was conducted at 1000° C. for 3 hours in a similar manner as in Example 1, and crystal phase was identified by powder X-ray diffraction, and the same pattern as cubic system garnet type $Li_7La_3Zr_2O_{12}$ was observed. For Sample numbers 41 to 46 in Table 3, similarly to Example 1, calcined powder was wet ground and then molded, and then fired in atmospheric air at 1100° C. for 3 hours, to obtain a sintered body. The sintered density and the lithium ion conductivity are shown in Table 4.

TABLE 3

| Sample number | Composition formula |
|---|---|
| 41 | $Li_{6.95}$ ($La_{2.90}Bi_{0.10}$) ($Zr_{1.95}Bi_{0.05}$) $O_{12}$ |
| 42 | $Li_{6.90}$ ($La_{2.95}Bi_{0.05}$) ($Zr_{1.90}Bi_{0.10}$) $O_{12}$ |
| 43 | $Li_{6.90}$ ($La_{2.80}Bi_{0.20}$) ($Zr_{1.90}Bi_{0.10}$) $O_{12}$ |
| 44 | $Li_{6.80}$ ($La_{2.90}Bi_{0.10}$) ($Zr_{1.80}Bi_{0.20}$) $O_{12}$ |
| 45 | $Li_{6.80}$ ($La_{2.60}Bi_{0.40}$) ($Zr_{1.80}Bi_{0.20}$) $O_{12}$ |
| 46 | $Li_{6.60}$ ($La_{2.80}Bi_{0.20}$) ($Zr_{1.60}Bi_{0.40}$) $O_{12}$ |

TABLE 4

| Sample number | Firing temperature | Sintered density (g/cm$^3$) | Lithium ion conductivity (S/cm) |
|---|---|---|---|
| 41 | 1100° C. | 4.58 | 4.0.E-04 |
| 42 | 1100° C. | 4.37 | 2.8.E-04 |
| 43 | 1050° C. | 4.59 | 1.6.E-04 |
| 44 | 1050° C. | 4.37 | 2.0.E-04 |
| 45 | 1000° C. | 4.28 | 1.6.E-04 |
| 46 | 1000° C. | 4.35 | 1.2.E-04 |

As can be seen from the results in Table 3 and Table 4, the present material is formed of a single phase having the same crystal structure as cubic system garnet type $Li_7La_3Zr_2O_{12}$ by containing a specified amount of Bi, and a sintered body having desired lithium ion conductivity can be provided by firing at relatively low temperature in short time by using the same.

Example 5

As the starting materials, respective powders of $Li_2CO_3$, $La(OH)_3$, $ZrO_2$, and $Al_2O_3$ (respectively having average grain size of about 0.5 μm) were used. First, the components other than $Al_2O_3$ were weighed to satisfy the composition formula $Li_7$($La_{0.9}Bi_{0.1}$)$_3Zr_2O_{12}$, and mixed. Then, $Al_2O_3$ was added in an amount of 0 to 3.0 parts by weight relative to 100 parts by weight of $Li_7$($La_{0.9}Bi_{0.1}$)$_3Zr_2O_{12}$. Calcination was conducted at 1000° C. for 3 hours in a similar manner as in Example 1, and crystal phase was identified by powder X-ray diffraction. The result is shown in Table 5. Sample number 51 ($Al_2O_3$ addition amount: 0 wt %) to Sample number 57 ($Al_2O_3$ addition amount: 2.5 wt %) showed the same pattern as cubic garnet type $Li_7La_3Zr_2O_{12}$ (LLZ (cubic)), and had almost a single phase, whereas in Sample number 58 ($Al_2O_3$ addition amount: 3.0 wt %), generation of $LaAlO_3$ was observed. For Sample numbers 51 to 58 in Table 5, similarly to Example 1, calcined powder was wet ground and then molded, and then fired in atmospheric air at 1000° C. for 3 hours, to obtain a sintered body. The sintered density and the lithium ion conductivity are shown in Table 5.

TABLE 5

| Sample number | $Al_2O_3$ addition amount (wt %) | Calcined powder constituting phase | Sintered density (g/cm$^3$) | Lithium ion conductivity (S/cm) |
|---|---|---|---|---|
| 51 | 0.0 | LLZ (cubic) | 4.16 | 1.3.E-04 |
| 52 | 0.5 | LLZ (cubic) | 4.28 | 2.2.E-04 |
| 53 | 1.0 | LLZ (cubic) | 4.32 | 2.5.E-04 |
| 54 | 1.2 | LLZ (cubic) | 4.43 | 3.0.E-04 |
| 55 | 1.5 | LLZ (cubic) | 4.44 | 2.9.E-04 |
| 56 | 2.0 | LLZ (cubic) | 4.42 | 2.6.E-04 |
| 57 | 2.5 | LLZ (cubic) | 4.38 | 2.1.E-04 |
| 58* | 3.0 | LLZ (cubic) + $LaAlO_3$ | 4.39 | 7.9.E-05 |

*outside the scope of the present invention

As is apparent from Table 5, in particular, when 0.5 to 2.5 parts by weight of $Al_2O_3$ is added relative to 100 parts by weight of the $Li_7(La_{1-x}Bi_x)_3Zr_2O_{12}$, higher sintered density can be obtained and higher lithium ion conductivity can be obtained. It is indicated that, especially by adding 1.0 to 1.5 parts by weight of $Al_2O_3$, sintered density of more than or equal to 4.3 g/cm$^3$, and high lithium ion conductivity (25° C.) of more than or equal to 2.5E-04 S/cm (=2.5×10$^{-4}$ S/cm) can be achieved.

Example 6

Figure 3:
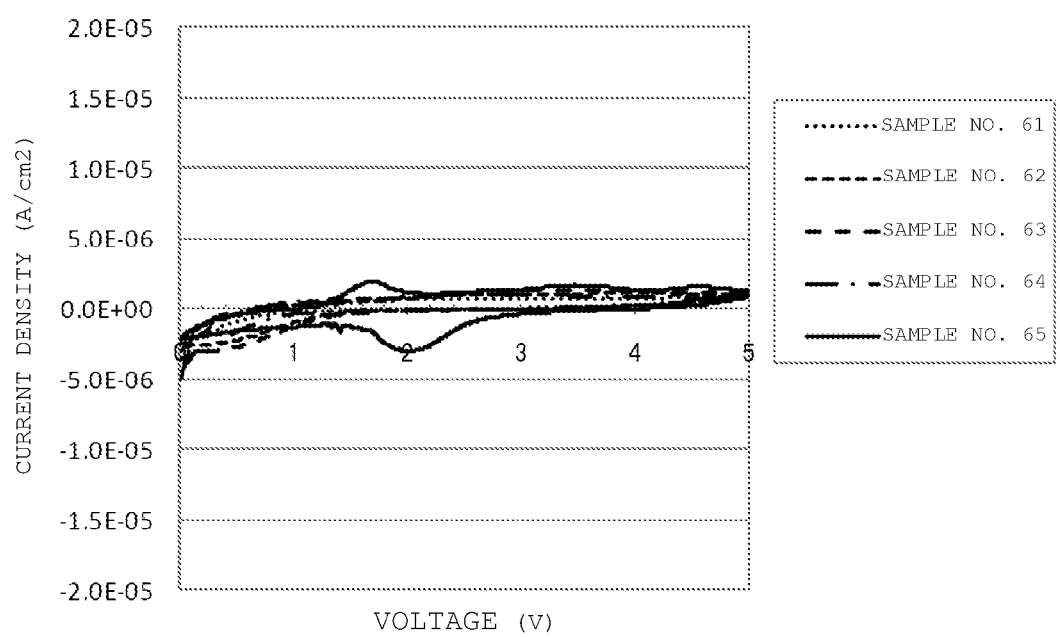
FIG. 3 is a cyclic voltammogram of a material for solid electrolyte prepared in Example 6.

As the starting materials, respective powders of $Li_2CO_3$, $La(OH)_3$, $ZrO_2$, $Bi_2O_3$, and $Al_2O_3$ (respectively having average grain size of about 0.5 μm) were used. First, the components other than $Al_2O_3$ were weighed to satisfy each composition formula in Table 6, and mixed. Then $Al_2O_3$ was added in an amount of 1.2 parts by weight relative to 100 parts by weight of each composition in Table 6. Calcination was conducted in atmospheric air at 900° C. for 3 hours in a similar manner as in Example 1, and crystal phase was identified by powder X-ray diffraction. The result showed the same pattern as cubic garnet type $Li_7La_3Zr_2O_{12}$ (LLZ (cubic)). For Sample numbers 61 to 65 in Table 6, similarly to Example 1, calcined powder was wet ground and then molded, and then fired in atmospheric air at 1050° C. for 3 hours, to obtain a sintered body. On one surface of the obtained sintered body, platinum was vapor-deposited, and on the other surface Li metal was pasted, and a potential window was examined by scanning (1 mV/sec) the potential at 0 to 5 V (vs. Li$^+$/Li). As shown in FIG. 3, in Sample number 65 wherein only Zr sites were substituted by Bi, oxidation and reduction currents flew at around 2 V, whereas Sample number 61 wherein La sites were substituted by Bi, and Sample numbers 62 to 64 wherein both La sites and Zr sites were substituted by Bi were electrochemically stable in the range of 0 to 5 V.

TABLE 6

| Sample number | Composition formula |
|---|---|
| 61 | $Li_{7.00}$ $(La_{2.70}Bi_{0.30})$ $Zr_{2.00}O_{12}$ |
| 62 | $Li_{6.90}$ $(La_{2.80}Bi_{0.20})$ $(Zr_{1.90}Bi_{0.10})$ $O_{12}$ |
| 63 | $Li_{6.85}$ $(La_{2.85}Bi_{0.15})$ $(Zr_{1.85}Bi_{0.15})$ $O_{12}$ |
| 64 | $Li_{6.80}$ $(La_{2.90}Bi_{0.10})$ $(Zr_{1.80}Bi_{0.20})$ $O_{12}$ |
| 65 | $Li_{6.70}La_{3.00}(Zr_{1.70}Bi_{0.30})$ $O_{12}$ |

What is claimed is:

1. A material for a solid electrolyte, wherein the material is an oxide containing Li, La, Zr and Bi, and the oxide has a cubic system garnet crystal structure wherein La sites are partly or entirely substituted by Bi, and the oxide is represented by a composition formula $Li_7(La_{1-x}Bi_x)_3Zr_2O_{12}$, wherein $0.01 \leq x \leq 0.2$.

2. The material for a solid electrolyte according to claim 1, wherein Al is contained in the cubic system garnet crystal structure.

3. The material for a solid electrolyte according to claim 2, wherein the Al is contained in an amount of 0.5 to 2.5 parts by weight in terms of $Al_2O_3$ relative to 100 parts by weight of the cubic system garnet crystal.

4. The material for a solid electrolyte according to claim 1, wherein no peak of an Al or an Al compound is observed in X-ray diffraction analysis of the material for the solid electrolyte.

5. The material for a solid electrolyte according to claim 1, wherein the material is in the form of a powder.

6. The material for a solid electrolyte according to claim 5, wherein the powder has an average grain size of 0.01 to 10 μm.

7. The material for a solid electrolyte according to claim 6, wherein the average grain size is 0.1 to 5 μm.

8. The material for a solid electrolyte according to claim 7, wherein an amount of substitution by the Bi of the La sites is 2 to 15% by mol in 100% by mol of La.

9. A method for producing a solid electrolyte-containing sintered body, the method comprising:
firing a raw material containing the material for a solid electrolyte according to claim 1 at a temperature of 900 to 1150° C. for 1 to 10 hours to obtain a sintered body.

10. The method according to claim 9, wherein the raw material is a mixture containing the material for the solid electrolyte, and a cathode active material or an anode active material.

11. The production method according to claim 9, wherein the raw material is a laminate including, in sequence, a layer formed of a green sheet for cathode, a layer containing the material for the solid electrolyte, and a layer formed of a green sheet for anode.

12. A solid electrolyte formed of a sintered body of the material for the solid electrolyte according to claim 1.

13. An entire solid lithium ion secondary battery comprising the solid electrolyte according to claim 12.

* * * * *